United States Patent [19]

Saatchi

[11] Patent Number: 5,174,934
[45] Date of Patent: * Dec. 29, 1992

[54] METHOD OF IN-SITU FABRICATION OF FOAMED THERMOPLASTIC ARTICLES AND ARTICLE

[75] Inventor: Hossein Saatchi, Rockford, Ill.

[73] Assignee: Sundstrand Corporation, Rockford, Ill.

[*] Notice: The portion of the term of this patent subsequent to Jun. 16, 2009 has been disclaimed.

[21] Appl. No.: 639,904

[22] Filed: Jan. 10, 1991

Related U.S. Application Data

[63] Continuation-in-part of Ser. No. 419,723, Oct. 11, 1989, which is a continuation-in-part of Ser. No. 335,047, Apr. 7, 1989.

[51] Int. Cl.⁵ ............................................. B29C 67/00
[52] U.S. Cl. ..................................... 264/46.4; 264/51; 264/54; 521/85; 521/87; 521/92; 521/97; 521/113
[58] Field of Search ................... 264/45.5, 46.4, 46.5, 264/46.6, 54, 51, 235, 255, 257, 261; 521/85, 87, 92, 97, 113

[56] References Cited

U.S. PATENT DOCUMENTS

| | | | |
|---|---|---|---|
| 4,025,686 | 5/1977 | Zion | 428/310 |
| 4,036,923 | 7/1977 | Saidla | 264/45.3 |
| 4,077,821 | 3/1978 | Doerfling | 156/79 |
| 4,379,103 | 4/1983 | Doerfling | 264/45.5 |
| 4,447,565 | 5/1984 | Lula et al. | 523/219 |
| 4,540,455 | 9/1985 | Brewer | 156/79 |
| 4,655,861 | 4/1987 | Kiss | 156/62.2 |
| 4,675,231 | 6/1987 | Kia | 428/285 |
| 4,692,381 | 9/1987 | Pecsok | 428/375 |
| 4,769,397 | 9/1988 | Lapierre et al. | 521/85 |
| 4,837,251 | 6/1989 | Okey et al. | 523/218 |
| 4,861,537 | 8/1989 | Ward et al. | 264/126 |
| 4,933,131 | 6/1990 | Okey et al. | 264/255 |

Primary Examiner—David A. Simmons
Assistant Examiner—J. Sells
Attorney, Agent, or Firm—Wood, Phillips, Van Santen, Hoffman & Ertel

[57] ABSTRACT

Processes using high temperature thermoplastic polymers in the in-situ fabrication in the formation of foamed composite sandwich or foam articles often result in weak unsound products which may be avoided by utilizing a high temperature thermoplastic in powder form (22), a blowing agent having a high decomposition temperature (24), and, if desired, reinforcers and/or fillers (28), admixing the thermoplastic, blowing agent and reinforcer and fillers (30), placing the admixture in a mold and, if forming a composite structure, in abutment with at least one skin (34), compacting the contents of the mold (37), and applying sufficient heat and/or pressure to the mold and its contents to melt the thermoplastic and generate gas within said mixture by decomposition of the blowing agent (38). Also, an activator may be included with the blowing agent which promotes the production of gas (26). The thermoplastic should be free from any material which will react with the blowing agent or the activator at temperatures below the melting point of the thermoplastic. Articles made by the process are also disclosed.

16 Claims, 2 Drawing Sheets

METHOD OF IN-SITU FABRICATION OF FOAMED THERMOPLASTIC ARTICLES AND ARTICLE

CROSS-REFERENCE TO RELATED APPLICATIONS

This is a continuation-in-part of U.S. application Ser. No. 07/419,723 to Saatchi et al., filed on Oct. 11, 1989 which in turn is a continuation-in-part of U.S. Ser. application No. 07/335,047 to Saatchi et al., filed on Apr. 7, 1989.

FIELD OF THE INVENTION

This invention relates generally to a method of making a foamed thermoplastic article and an article made by the method. In particular, the present invention relates to an in-situ fabrication process that requires cold compaction of a thermoplastic polymer composite to produce the foamed thermoplastic article.

BACKGROUND OF THE INVENTION

Admixtures of blowing agents and thermoplastic materials are subjected to elevated temperatures in a mold to produce a thermoplastic article that is foamed and has a cellular structure. The blowing agent makes the thermoplastic article of lower density and lighter in weight. The lower density and weight enables the foamed thermoplastic articles to be used more extensively in applications such as aircraft and space vehicles.

A method currently used to foam thermoplastics is to admix with the thermoplastic the blowing agent and/or other like material which volatilizes and generates gas upon exposure to elevated temperatures. The gas permeates the thermoplastic and produces the internal cellular structure of the foamed thermoplastic article. Many of the blowing agents used are chemical blowing agents which react with the thermoplastic through thermal or chemical decomposition in order to generate the required gas.

High temperature thermoplastic engineering polymers are useful in modern applications because of their high temperature resistance, their ability to be reinforced with fibrous or nonfibrous materials, and their ability to be processed at reasonable temperatures.

In foaming high temperature thermoplastic engineering polymers, conventional blowing agents volatilize at too low a temperature to be highly effective. Upon decomposition within a high temperature thermoplastic, the gas generated by these conventional blowing agents merely escapes the admixture and will not form the desired cellular structure because the thermoplastic will not have reached its melting temperature and cannot flow to form cells. Even when blowing agents which have decomposition temperatures at about the melting point of the high temperature thermoplastics are used other problems, such as lack of oxygen in a closed mold or insufficient gas production, are still present.

Advanced composite sandwich structures are fabricated in a laminated array that has a skin on either side of a core. The core is generally made of a cellular structure, honeycomb or structural foam (thermoset, thermoplastic, or nonpolymeric) material and is fabricated or molded to final dimensions because the machining of core materials is an expensive and labor-intensive process. Further, any dimensional deviation in the core may cause intrusion/extrusion of the bond line at the interface of the core and the skin. Intrusion can produce voids and thick bond lines, and extrusion may develop resin starvation and bridging. All these anomalies are detrimental and cause a decrease in the strength of sandwich structures.

Present methods for fabricating advanced composite high temperature thermoplastic polymeric materials such as those having a melting point temperature over 350° F., are expensive and difficult to use in producing complex geometry components. As an example, to fabricate a sandwich structure, expensive commingled graphite/thermoplastic skins may be used as reinforcements with pre-machined or pre-molded cores. Commingled fabrics are made by the intermingling of graphite and thermoplastic fibers. High pressures and temperatures are needed to produce sound structures, e.g., 10 ksi at 750° F. is required to injection mold solid polyetheretherketone (PEEK), and 350 psi at 750° F. is required to consolidate PEEK preimpregnated and commingled fabric. Due to the high operating and molding pressures needed for production and due to the difference in the thermal coefficients of expansion of the materials, cracks and voids may form in the structure. Also, failure to thoroughly wet the reinforcement may cause a weak interface between the matrix and fiber resulting in fiber pull-out and interfacial cracks and voids.

Dealing with these concerns of the fabrication process is expensive. Indeed according to one estimate relating to composite manufacture for use in helicopter fuselages, fabrication accounts for 58% of fuselage formation cost with the remaining 42% being relatively equally divided between the costs of materials, assembly and quality assurance.

In in-situ fabrication of foamed high temperature thermoplastic advanced composites, high internal pressure is needed to consolidate the sandwich. Due to the high operating and molding pressures needed for production and due to the difference in thermal coefficients of expansion of the thermoplastic and skin, cracks and voids may form in the composite if insufficient pressure is present. Failure to produce sufficient in-situ pressure to consolidate the thermoplastic skin will also result in an inconsistent foaming action.

The present invention is directed to overcoming one or more of the above problems.

SUMMARY OF THE INVENTION

It is a principal object of the invention to provide a new and improved process for foaming high temperature thermoplastics and to consistently form articles that are sound monolithic or composite structures in an in-situ fabrication process.

The principal object of the invention is achieved in a process which includes the step of providing a generally powder-like admixture including a blowing agent and a high melting temperature thermoplastic that is free from materials which will react with the blowing agent at a temperature below about the melting point of the thermoplastic. The blowing agent is also chosen to be nonreactive with the thermoplastic at a temperature below that of the melting point of the thermoplastic and has a decomposition temperature near or above the thermoplastic's melt temperature. The admixture is then placed in a mold cavity of a mold, sufficient pressure is applied to the admixture to cause compaction thereof and thereafter sufficient heat and/or pressure is applied to the mold and its contents to melt the thermoplastic and decompose the blowing agent, thus producing the desired gas for foaming and internal pressure for consolidation. The compaction pressure is applied at a temperature below the melting temperature of the thermoplastic and preferably at about ambient temperature. The heat and/or pressure applied to the mold and compacted admixture is sufficient to chemically or mechanically bond the thermoplastic.

Optionally, a skin can be placed adjacent to at least one interior mold surface prior to application of the compaction pressure. The skin can be an impregnated or unimpregnated mat, braid, unidirectional, interlaced or like material. Alternatively, the skin can be a commingle fabric.

Material, such as breather cloth, can be placed in the mold and about the article to provide a channel for escape of evolved gases produced during heating. Also, material, such as peel ply, can be placed on the breather cloth to prevent bonding of the breather cloth to the molded article. The peel ply used should not be wetted by the polymer and may contain mold-release agents.

The volume of the admixture can be larger than that of the finished article and according to the invention, compaction in a mold is required. The mold cavity must, of course, be capable of accommodating the volume of the precompacted contents of the mold.

Shims can be utilized to precisely control the size of the mold cavity and thereby control the degree of compaction of the admixture. Furthermore, shims permit the pressure exerted on the mold to be greater than the pressure exerted on the admixture in the mold cavity.

Heating of the mold is performed and may be accomplished by an oven or heated press. The mold and its contents are heated to above the melting point of the thermoplastic for a time sufficient to consolidate the thermoplastic and/or skin, unless the process is being used to impregnate the skin. If impregnation is desired, heating is carried on at a temperature and for a time sufficient to melt the thermoplastic and impregnate the skin.

Upon completion of the heating, and after any necessary cooling of the article, the article is stripped from the mold, and the peel ply and breather cloth, if used, are removed.

An activator which will promote the production of gas may also be used. The activation, resulting from the activator itself reacting with the blowing agent or from the blowing agent reacting with the activator's decomposition products, takes place at a temperature near or above the thermoplastic's melting point. The activator solves the problem of incomplete decomposition of the blowing agent and also may provide fluid pressure for consolidation through its own decomposition. The enhanced pressure resulting from the activation results in more consistent, sound, foamed articles. When using skins in the process, better consolidation of the skins will also be attained due to the enhanced pressure created.

In highly preferred embodiments of the invention, sodium borohydride is used as the blowing agent, magnesium hydroxide is used as an activator, and also as a source of nucleating materials and polyetheretherketone is used as the thermoplastic.

Additives can be advantageously used to improve the properties of the thermoplastic article. Fillers and/or reinforcers made from materials such as but not limited to, glass and carbon, and in the form of microballoons, fibers, spheres, whiskers, and other shapes, can be used to increase the stiffness or strength of the material.

The process of the present invention overcomes the prior art problems associated with the conventional blowing agents and dimensional deviation in the core of the composite structure and also results in reduction in the formation of cracks and voids in the article.

The invention is also directed to articles produced by the present process.

Other objects and advantages will become apparent from the following specification and accompanying drawings.

DESCRIPTION OF THE PREFERRED EMBODIMENT

This invention relates to the process for the foaming of articles that are monolithic or composite high-temperature thermoplastic structures suitable for use in environments where high temperature resistant, light weight or low density, strong articles are required. Preferably the thermoplastic material used has a relatively high melting point, being in excess of 350° F. By way of example, suitable thermoplastics include polyethereretherketone (PEEK), polyetherimide (PEI), and polyetherketoneetherketoneeketone (PEKEKK), although others may be used.

The structures will normally include reinforcers and/or fillers. The reinforcers and fillers provide the resulting thermoplastic article with advantageous properties such as lower thermal expansion and added strength and stiffness.

The reduction in relative weight or density in the finished structure is obtained through use of a foaming agent that is admixed with the thermoplastic. Importantly, the foaming agent will not appreciably generate gas required to foam until temperatures in excess of the melting point of the thermoplastic are reached. At temperatures on the order of 650° F. to 800° F., the blowing agent sodium borohydride, for example, will begin to decompose, generating molecular hydrogen gas for foaming a molten high melting temperature thermoplastic such as PEEK. Sodium borohydride is used as a physical blowing agent where it will not appreciably react chemically with the thermoplastic or materials contained in the thermoplastic at temperatures below the melting point of the thermoplastic. As an example, if the thermoplastics or materials used are not dry, the water contained in the materials can react with the sodium borohydride before the melting point of the thermoplastic is reached which decreases the amount of foaming. Consequently, the thermoplastic should not react with the blowing agent at temperatures below the melting point of the former. Similarly, materials used other than the thermoplastic should not react with the blowing agent unless at temperatures near or above the melting point of the thermoplastic.

Figure 1:
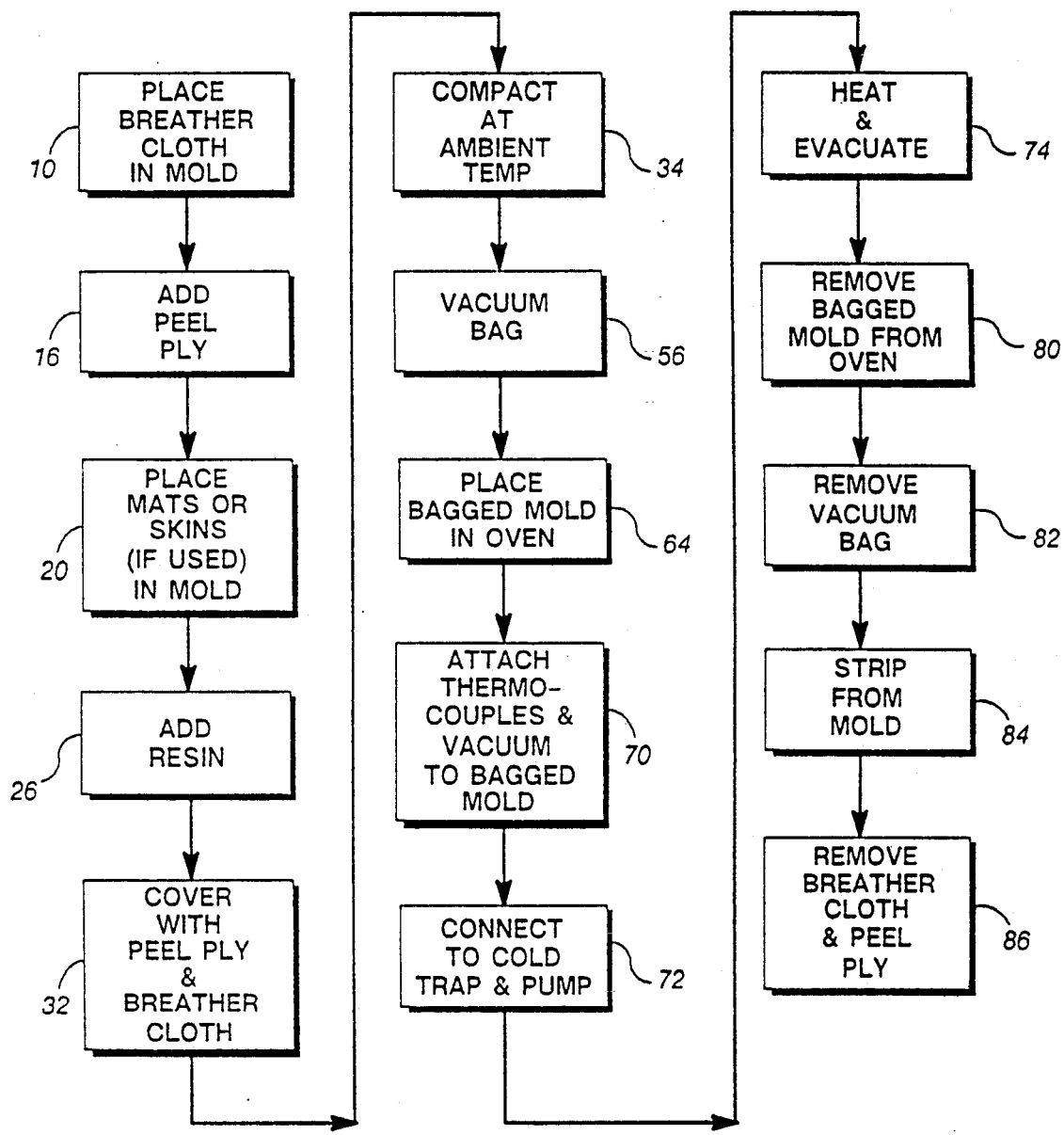
FIG. 1 is a block diagram indicating the use of the process of the invention for an in-situ fabrication of an article.

FIG. 1 illustrates the exemplary embodiment of the invention, an in-situ fabrication of an article that is a foamed high temperature thermoplastic composite. The process may also be used for the production of polymeric articles of monolithic construction simply by eliminating the steps involving the manipulation and use of skins.

In the block diagram the first step or block 22 is to provide a thermoplastic powder, preferably polyetheretherketone powder (PEEK). PEEK has a melting point temperature in excess of 650° F. and has desirable characteristics including resistance to high temperatures and the ability to be reinforced with fibrous and nonfibrous additives.

A preferred blowing agent such as sodium borohydride in powder form is provided as step 24. Sodium borohydride is a favorable blowing agent in the production of such foams and can be used as a fine powder, which aids in handling and processing. Sodium borohydride is used as a physical blowing agent in that it will not react with the thermoplastic or any materials contained therein below the thermoplastic's melt temperature and in any case decomposes and generates gas without the requirement of a chemical reaction involving the thermoplastic.

Equation 1 illustrates the decomposition of sodium borohydride when no activator is used.

$$O_2 + NaBH_4 \rightarrow 2H_2 + NaBO_2 \qquad (1)$$

The oxygen for the reaction is provided by the surrounding environment. Of course, in a closed mold the oxygen can become scarce and the foaming action can be inhibited. Without sufficient oxygen the article may not foam uniformly.

The desired density of the finished product can be calculated on the basis of gas laws and the rule of mixtures can be accurately predicted on the basis of starting composition. For example, in a mixture with no activator, 0.02 grams of sodium borohydride can be mixed with 100 grams of thermoplastic for a slight reduction in density. On the other hand 0.10 grams can be added for a greater density reduction on the order of 50%.

In an inert environment which lacks appreciable amounts of oxygen, sodium borohydride will start to thermally decompose around 975° F. This temperature is above the processing temperature range of presently available high temperature thermoplastics. However, this phenomenon may be used for foaming materials with melting point temperatures above 1,000° F., such as aluminum, magnesium, or next generations of high temperature organic materials.

Step 26 is to provide an activator for the blowing agent such as magnesium hydroxide. This step is optional but often is highly desirable when insufficient oxygen is present as is the case especially when forming large parts. Magnesium hydroxide has a decomposition temperature in excess of 650° F. The improvement in using magnesium hydroxide is that it will promote the generation of hydrogen gas for foaming by decomposing into magnesium oxide, which acts as nucleating material, and water, which acts as an activator. The water reacts with the sodium borohydride to produce hydrogen gas. By such promotion, more hydrogen gas will be generated producing more pressure, thus resulting in consistently sound articles. The problem of lack of oxygen in a closed mold, as previously referred to, is also avoided.

The following Equations 2, 3 and 4 describe the reactions involved:

$$2Mg(OH)_2 \longrightarrow 2MgO + 2H_2O \qquad (2)$$

$$NaBH_4 + 2H_2O \longrightarrow NaBO_2 + 4H_2 \uparrow \qquad (3)$$

$$NaBH_4 + 2Mg(OH)_2 \longrightarrow 2MgO + NaBO_2 + 4H_2 \uparrow \qquad (4)$$

Equation 2 illustrates the decomposition of magnesium hydroxide into magnesium oxide and water. In Equation 3 the sodium borohydride reacts with water to form hydrogen gas. Thus, two moles of water react with one mole of sodium borohydride to produce four moles of hydrogen gas and for every one gram of sodium borohydride used, 2.37 liters of gas result. Equation 4 represents the overall reaction process. In this reaction the sodium borohydride to magnesium hydroxide ratio is preferably 1:3 by weight.

The next step, shown at 28, is to provide additives such as reinforcers and/or fillers. This step is not required but additives can be used to improve the properties of the thermoplastic articles. A variety of fibers, balloons, spheres, whiskers and other shapes can be used to increase the stiffness or strengthen the material. Such materials include carbon fibers and microspheres, glass fibers and microballoons, Sic whiskers, calcium carbonate, wollastonite and other fillers.

Carbon fiber and/or glass or carbon microspheres are conventionally used as reinforcers and fillers. When carbon fiber is used, as an example, the material may be obtained as commingled or unidirectional fabric, carbon/PEEK hybrid fabric, and carbon/PEEK unidirectional tape. Glass microspheres with a diameter of 5.8 mils having densities of 0.0216 lbs./in.$^3$ and 0.016 lbs./in.$^3$, and carbon hollow microspheres, either Type E having an average diameter of 0.82 mils and a density of 0.0134 lb./in.$^3$ or Type L having an average diameter of 1.96 mils and a density of 0.0055 lb./in.$^3$, (both types manufactured by Versar Mfg. Inc.), have been employed with success. The glass and carbon microspheres have isostatic crushing strengths of 10, 4, 8, and 2.5 ksi respectively.

The polyetheretherketone, sodium borohydride, magnesium hydroxide, and additives are then admixed in step 30. Admixing can be accomplished utilizing a conventional mixer such as a double planetary mixer commercially available from the Ross Co. Preferably, admixing does not damage any reinforcers or fillers that are present.

Step 32 is to place one or more skins in a mold. The skin can be cut into the desired shape prior to introduction into the mold. The term skin includes preforms, filament wound, stitched reinforced, mats, braids, and woven fabrics. The skins may be pre-impregnated or commingled. This step is optional, being used only when composite sandwich structures are to be formed. When the article is to be a foamed monolithic structure, this step 32 is omitted entirely.

Representative of the skins suitable for use in the present invention are resin/substrate skins wherein the resin impregnates the substrate. Representative of these skins are APC-2 (commercially available from ICI America)/carbon tape (commercially available from Fiberite), APC-2/commingle fabric, APC-2/unidirectional skin material (commercially available from Textile Technology), APC-2/interlaced reinforced skin materials (commercially available from Quadrax) and nylon 12/carbon tape (both commercially available from Baycomp of Burlington, Ontario under the product designation PA12/BTCA-450-033-55 CARBON. Skin materials such as APC-2/carbon tape and APC-2/carbon interlaced utilize consolidation pressures in the range of about 15 to about 120 psi. The commingle skins require a relatively higher pressure in the range of about 200 to about 500 psi. The fibers in the tape and interlace materials are already impregnated with resin whereas the fibers in the commingle materials become impregnated during the fabrication process.

Placing the admixture of the thermoplastic, sodium borohydride, magnesium hydroxide, and additives in the mold and in abutment with the skin, if used, is the next step, shown at step 34.

Optional step 35 is to insert shims of the desired thickness between the two sections of the mold. The shims can be utilized to precise control the degree of cold compaction by controlling the size of the mold cavity when the mold is closed. Also, the shims can permit increased pressure to be exerted on the mold without increasing the pressure on the contents of the mold.

Step 36 is also optional and is to place another skin on the admixture. The two skins used will form the outer covering of the article that is a composite sandwich structure being produced. For foam monolithic article production, this step is omitted.

Step 37 is to cold compact the contents of the mold to obtain a net-shape configuration. The cold compaction takes place at a temperature below the melting temperature of the thermoplastic and preferably takes place at substantially ambient temperatures, i.e., about 60° to about 90° F., and, when using PEEK, PEI or PEKEKK, pressures up to 5 ksi are used.

Sufficient heat and/or pressure is then applied, step 38, to the mold and its contents for a time period sufficient to consolidate the admixture. The thermoplastic will melt and hydrogen gas will be generated by the decomposition of the magnesium hydroxide and sodium borohydride and by the subsequent reaction as illustrated in Equation 4. During in-situ fabrication, high internal pressure is developed therein and the mold is required to have sufficient clamping pressure to keep the press holding the mold from opening during consolidation. Higher pressures are needed when the skin is not preimpregnated as compared to when a skin that is preimpregnated is utilized. Thus, the pressure required can be reduced by utilizing preimpregnated skins. Utilization of the preimpregnated skin also reduces the compaction pressure.

The density of the article is controlled by the amount of admixture and skins placed in the mold, the compaction pressure exerted on the contents of the mold, the blowing agent utilized and the geometry of the mold.

Step 40 is to strip the article from the mold and to remove any breather cloth and peel ply if any was utilized.

It should be further noted that the invention provides strong structures without the breakage of reinforcement such as glass microspheres or fibers that typically occurs with injection molding.

Figure 2:
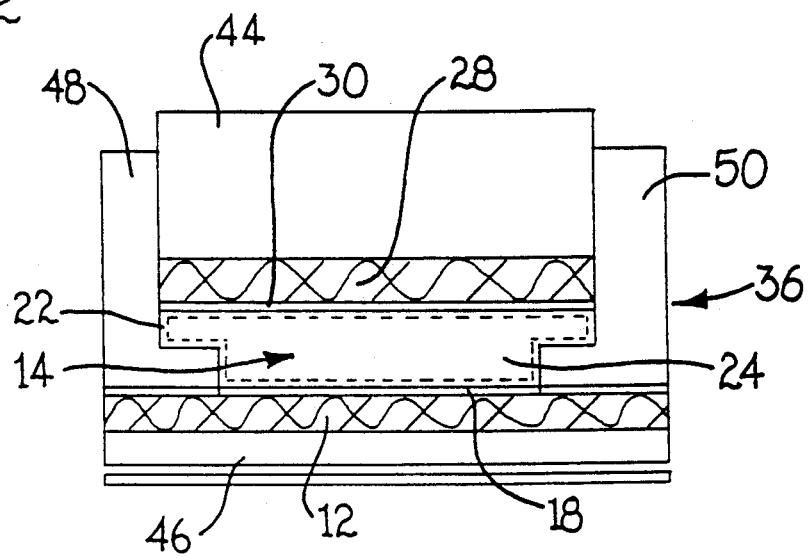
FIGS. 2A and 2B are schematic representations of a filled mold before and after compaction.
Figure 3:
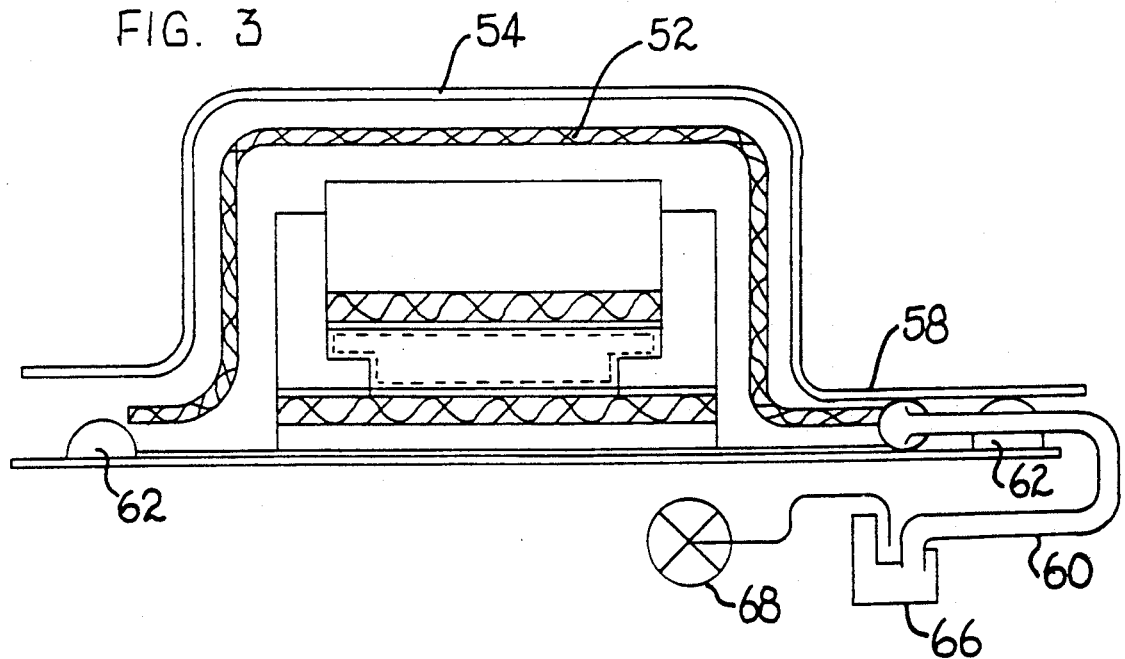

Compaction of the admixture and skins and a mold is schematically illustrated in FIGS. 2A and 2B. As shown in FIG. 2A, the mold 42 has a bottom section 44 and a top section 46 that define a cavity 48 therebetween. A first skin 50 is placed adjacent to the interior surface of the bottom section 44. An admixture 52 is then introduced into the mold cavity on top of the first skin 50. A second skin 54 is placed on top of the admixture 52. Optional shims 56 can be positioned between the bottom section 44 and top section 46 to control the size of the cavity 48 and hence the compaction of the contents of the mold. The top section 46 is then placed on top of the second skin 54.

Sufficient pressure is then applied to the mold and its contents for a time period effective to achieve compaction of the contents of the mold. FIG. 2B shows the mold 42 after compaction. Compacted skins and admixture 58 are contained within the mold 42.

The following example is presented by way of illustration only and not by way of limitation.

EXAMPLE 1

Cold Compaction

To fabricate a sheet 4 inches by 4 inches by 0.5 inches in a mold, an admixture of 125 grams (g) of PEEK, 1.9 g of sodium borohydride and 3.8 g of magnesium hydroxide was prepared. Two commingle fabric skins were placed in the mold. Then the admixture was placed on top of the skins. Two commingle fabric skins were then placed on top of the admixture. The height of the contents of the mold was about one inch. Then, a pressure of 5,000 psi was applied to the mold and the contents thereof to reduce the height of the contents to 0.5 inches.

What is claimed is:

1. A process for the production of foamed, high temperature thermoplastic articles comprising the steps of:
   (a) providing a generally powder-like admixture comprising a high temperature thermoplastic, magnesium hydroxide and sodium borohydride, the thermoplastic being free from materials that will react with the sodium borohydride at a temperature less than the melting temperature of the thermoplastic;
   (b) providing a mold;
   (c) introducing the admixture into the cavity of the mold; and
   (d) compacting the contents of the mold at a temperature below the melting temperature of the thermoplastic.

2. The process in accordance with claim 1 further comprising a step prior to the compaction step of (d) of introducing at least one skin into the mold cavity.

3. The process in accordance with claim 1 wherein the admixture further comprises an activator that will cause activation of the sodium borohydride at a temperature near or above the melting point of the thermoplastic.

4. The process in accordance with claim 1 wherein the admixture further comprises at least one of reinforcers or fillers.

5. The process in accordance with claim 1 wherein the step of compacting occurs at ambient temperature.

6. The process in accordance with claim 1 further comprising, after the compacting step, the step of (e) applying at least one of heat or pressure to the mold to cause consolidation of the thermoplastic.

7. The process in accordance with claim 1 wherein the thermoplastic is selected from the group of polyetheretherketones, polyetherimides and polyetherketoneetherketoneketones.

8. The process in accordance with claim 1 wherein the step of compacting includes compacting the contents of the mold to the desired final shape.

9. The process in accordance with claim 1 further comprising the step of controlling the compaction of the contents using shims.

10. An article made in accordance with the process of claim 1.

11. A process for the production of foamed, high temperature thermoplastic articles from a generally powder-like admixture that is placed in a mold the admixture has a high temperature thermoplastic and a blowing agent wherein the thermoplastic is free from materials that will react with the blowing agent at a temperature below about the melting point of the thermoplastic and wherein the blowing agent has a decomposition temperature near the melting point of the thermoplastic, comprising the step of compacting the contents of the mold at a temperature below the melting temperature of the thermoplastic.

12. The process in accordance with claim 11 wherein the step of compacting includes compacting the contents of the mold to a desired final shape.

13. The process in accordance with claim 11 further comprising the step of controlling the compacting of the contents using shims.

14. An article made in accordance with the process of claim 9.

15. The process in accordance with claim 11 further comprising the step, after the compacting step, of melting the thermoplastic.

16. A process for the production of foamed, high temperature thermoplastic articles comprising the steps of:
(a) providing a general powder-like admixture comprising a high temperature thermoplastic, magnesium hydroxide and sodium borohydride, the thermoplastic being free from materials that will react with the sodium borohydride at a temperature less than the melting temperature of the thermoplastic;
(b) providing a mold defining a cavity therein;
(c) introducing the admixture in a powder-like condition into the cavity of the mold;
(d) compacting the powder-like admixture in the mold at a temperature below the melting temperature of the thermoplastic; and
(e) consolidating the thermoplastic after the compacting step by applying at least one of heat or pressure to the thermoplastic.

* * * * *